United States Patent
Udd et al.

(10) Patent No.: US 9,132,386 B2
(45) Date of Patent: Sep. 15, 2015

(54) EXHAUST AFTERTREATMENT SYSTEM AND METHOD FOR OPERATING THE SYSTEM

(75) Inventors: Sören Udd, Nödinge (SE); John Korsgren, Hisings Kärra (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/367,921

(22) PCT Filed: Dec. 23, 2011

(86) PCT No.: PCT/SE2011/000248
§ 371 (c)(1),
(2), (4) Date: Jul. 15, 2014

(87) PCT Pub. No.: WO2013/095214
PCT Pub. Date: Jun. 27, 2013

(65) Prior Publication Data
US 2014/0363358 A1 Dec. 11, 2014

(51) Int. Cl.
*B01D 53/94* (2006.01)
*F01N 3/20* (2006.01)
(Continued)

(52) U.S. Cl.
CPC .......... *B01D 53/9431* (2013.01); *F01N 3/035* (2013.01); *F01N 3/106* (2013.01); *F01N 3/208* (2013.01); *F01N 3/28* (2013.01); *F01N 9/00* (2013.01); *F01N 13/0093* (2014.06); *F01N 2340/00* (2013.01); *F01N 2610/01* (2013.01); *F01N 2610/02* (2013.01);
(Continued)

(58) Field of Classification Search
CPC .......... B01D 53/9404; B01D 53/9418; B01D 53/9477; F01N 3/2066; F01N 3/208
See application file for complete search history.

(56) References Cited

U.S. PATENT DOCUMENTS 8,601,796 B2 * 12/2013 Hinz et al. ............ 60/295
2006/0117741 A1 6/2006 Mayer et al.
(Continued)

FOREIGN PATENT DOCUMENTS

CN 104136099 A * 11/2014 .......... B01D 53/90
DE 102009038835 A1 3/2011
(Continued)

OTHER PUBLICATIONS

International Search Report (Sep. 3, 2012) for corresponding International App. PCT/SE2011/000248.
(Continued)

*Primary Examiner* — Timothy Vanoy
(74) *Attorney, Agent, or Firm* — WRB-IP LLP

(57) ABSTRACT

An exhaust system includes a first SCR catalyst and a second SCR catalyst positioned downstream of the first SCR catalyst. A first injector is provided upstream of the first SCR catalyst, and a second injector is provided upstream of the second SCR catalyst. The exhaust system further includes a gaseous ammonia supply device fluidly connected to the first injector for supplying gaseous ammonia to the exhaust gas by the first injector, and an ammonia-containing reductant reservoir fluidly connected to the second injector for supplying a fluid ammonia-containing reductant, such as urea, to the exhaust gas by the second injector. The first SCR catalyst has a smaller volume than the second SCR catalyst for a fast warm-up of the first SCR catalyst.

19 Claims, 2 Drawing Sheets

(51) Int. Cl.
　　　*F01N 3/10*　　　(2006.01)
　　　*F01N 3/28*　　　(2006.01)
　　　*F01N 3/035*　　(2006.01)
　　　*F01N 13/00*　　(2010.01)
　　　*F01N 9/00*　　　(2006.01)

(52) U.S. Cl.
　　　CPC .... *F01N 2610/06* (2013.01); *F01N 2900/1602* (2013.01); *Y02T 10/24* (2013.01)

(56) References Cited

U.S. PATENT DOCUMENTS

| | | |
|---|---|---|
| 2007/0051096 A1 | 3/2007 | Pfeifer et al. |
| 2007/0122317 A1* | 5/2007 | Driscoll et al. ............... 422/170 |
| 2008/0060348 A1 | 3/2008 | Robel et al. |
| 2011/0162347 A1 | 7/2011 | Katare et al. |
| 2011/0283680 A1 | 11/2011 | Gekas et al. |
| 2015/0052878 A1* | 2/2015 | Qi .................................. 60/277 |

FOREIGN PATENT DOCUMENTS

| | | |
|---|---|---|
| WO | 9956858 A2 | 11/1999 |
| WO | 2008030314 A1 | 3/2008 |

OTHER PUBLICATIONS

International Preliminary Report on Patentability (Jan. 8, 2014) for corresponding International App. PCT/SE2011/000248.
European Search Report (Jun. 29, 2015) for corresponding European App. EP11 87 8074.

* cited by examiner

EXHAUST AFTERTREATMENT SYSTEM AND METHOD FOR OPERATING THE SYSTEM

BACKGROUND AND SUMMARY

The present invention relates to an exhaust system for receiving an exhaust gas, wherein the exhaust system comprising a first SCR catalyst, a second SCR catalyst positioned downstream of said first SCR catalyst, a first injector provided upstream of said first SCR catalyst, and a second injector provided upstream of said second SCR catalyst.

Engines, in particular diesel-powered combustion engines but also other engines known in the art, produce exhaust gases which contain several air pollutants, including carbon monoxide (CO), hydrocarbons (HC), nitrogen oxides NO and NO2 (NOx) as well as particulate matter (PM) containing carbonaceous matter, or soot.

With increased attention to environmental problems and health hazard prevention, exhaust emission regulations are becoming more and more stringent.

To reduce the amount of NOx in the exhaust gases, some engines are equipped with Selective Catalytic. Reduction (SCR) systems that convert a mixture of NOx and ammonia (NH3) into nitrogen gas (N2) and water (H2O). For example, document US 2008/0060348 A1 shows an exhaust system for reducing NOx comprising a first SCR catalyst, a second SCR catalyst, and a particulate filter positioned between said first and second SCR catalyst. This system however exhibits a limited efficiency for removal of the above mentioned pollutants during low-temperature exhaust conditions, such as after cold start of the engine, or during low-temperature operation, e.g. low-speed urban driving conditions. Consequently, in order to combine an efficient NO2-based oxidation of stored PM in the particulate filter with a maximum efficiency for removal of the above mentioned NOx pollutants during low-temperature exhaust conditions, further improvement in reductant dosing definition and a dedicated operating strategy according to the present invention is beneficial.

Another problem with efficient exhaust treatment systems in general is relatively short refill-intervals of the ammonia-source that is required for operation of the SCR catalyst.

Still another problem with efficient exhaust treatment systems is the physical size of the system and the limited space available in modern vehicles, rendering packaging of the exhaust aftertreatment system difficult.

There is thus a need for an improved exhaust aftertreatment system that removes the above mentioned disadvantage.

It is desirable to provide an inventive exhaust system for receiving an exhaust gas and a method for operating the system where the previously mentioned problems are avoided. Said exhaust system comprising a first SCR catalyst, a second SCR catalyst positioned downstream of said first SCR catalyst, a first injector provided upstream of said first SCR catalyst, and a second injector provided upstream of said second SCR catalyst.

According, to an aspect of the present invention, said exhaust system further comprising a gaseous ammonia supply device being fluidly connected to said first injector for supplying gaseous ammonia to said exhaust gas by said first injector, and an ammonia-containing reductant reservoir being fluidly connected to said second injector for supplying a fluid ammonia-containing reductant, such as urea, to said exhaust gas by said second injector. Said first SCR catalyst has a smaller volume than said second SCR catalyst for a fast warm-up of said first SCR catalyst.

The inventive arrangement has preferably two clear operating modes: low-temperature exhaust gas operating mode and high-temperature exhaust gas operating mode. During the low-temperature exhaust gas operating mode, gaseous ammonia is injected upstream of the first SCR catalyst, which efficiently reduces NOx of the exhaust gases. In general, no ammonia-containing reductant is injected by the second injector in this operating mode. During the high-temperature exhaust gas operating mode, ammonia-containing reductant is injected upstream of the second SCR catalyst, which efficiently reduces NOx of the exhaust gases. Generally, no gaseous ammonia is injected by the first injector in this operating mode. The inventive arrangement results not only in significantly improved NOx emissions control during cold start and low-temperature exhaust operating conditions in general, but also in maintained long service intervals of the exhaust aftertreatment system, as well as improved exhaust system packaging.

The inventive exhaust system is designed to perform efficient NOx reaction by means of the first SCR catalyst also at a reduced exhaust temperature level compared with the prior art, such that catalytic NOx reduction can be performed at an earlier stage upon engine cold-start. There are a number of underlying reasons behind this technical effect:

The first SCR catalyst exhibits a smaller volume than the second SCR catalyst. For any given substance, the heat capacity of a body is directly proportional to the amount of substance it contains. As a consequence, the temperature of a smaller volume SCR catalyst may be more rapidly increased than a larger volume SCR catalyst due to the smaller heat capacity of the smaller SCR catalyst compared with the larger SCR catalyst.

The SCR catalyst requires ammonia for the catalytic removal of NOx emissions in the exhaust gases. When injecting a fluid ammonia-containing reductant, such as urea, the decomposition reaction of said reductant to active reagent gaseous ammonia within the exhaust passage requires a certain temperature level of the exhaust gases at the injection position for substantially complete decomposition, e.g. normally around 200° C. Injection of the ammonia-containing reductant can thus not be initiated much below said temperature level, thereby strongly limiting the NOx emission abatement efficiency. However, by supplying gaseous ammonia instead if a fluid ammonia-containing reductant, there is no requirement to wait with injection until the exhaust gases have reached said temperature level. Consequently, the NOx emission abatement can be initiated at a lower temperature, allowing the full active temperature window of the SCR catalyst to be employed, e.g., down to temperatures around 150° C.

Moreover, the inventive arrangement as a consequence also results in improved NOx emissions control upon entering a low-temperature exhaust operating conditions, such as traffic jams, low-speed urban driving conditions, or the like, because the system may always go back from the high temperature exhaust gas operating mode to the low temperature exhaust gas operating mode as described above when necessary.

A further inventive advantage of having a small first SCR catalyst is the simplified arrangement of said catalyst close to the outlet of the engine or turbocharger, where the space is very limited. The relatively small size of the first SCR catalyst allows closer arrangement thereof to the engine. Hence, the limitation in size of the first SCR catalyst is a factor supporting the improved NOx emission reduction of the present invention. The addition of gaseous ammonia upstream the first SCR catalyst enables a very short mixing distance, utilizing the turbulence created directly downstream the turbocharger outlet, further enabling a compact packaging solution.

Another inventive advantage of an aspect of the present invention results from the specific supply arrangement of the active reagent ammonia to the first and second SCR catalyst of the invention. The combination of supplying gaseous ammonia to the first SCR catalyst and fluid ammonia-containing reductant, such as urea, to the second SCR catalyst allows, by means of intelligent dosing strategy of said first and second ammonia source, extended service intervals of the exhaust aftertreatment system, rendering said system more efficient, reliable and cost effective. For example, by supplying, gaseous ammonia via the first injector to the first SCR catalyst only during the low-temperature exhaust gas operating mode, such as cold-start and certain urban driving conditions, and upon reaching a certain exhaust gas temperature at the second SCR catalyst, supplying ammonia-containing reductant via the second injector to the second SCR catalyst while stopping the supply of gases ammonia, the first as second SCR catalyst are operated more or less non-simultaneously. This type of dosing strategy, which is possible by means of the inventive arrangement, does not only enables a very high NOx conversion efficiency without any penalty to fuel economy but also results in significantly extended service intervals of the exhaust aftertreatment system, i.e. longer time periods between refill or exchange of the ammonia sources. It is of course possible to have a less distinct transition between injection at the first or the second injector, and catalytic operation of the first or second SCR catalyst and both SCR catalysts may be configured to be simultaneously catalytically active during a transition period.

An advantage of having, a substantially non-simultaneous dosing strategy is more efficient N02-based PM regeneration process of a particulate filter when such is provided in the exhaust system, because the N02-based PM regeneration process, which is essentially only possible when dosing of gaseous ammonia to the first SCR catalyst has been stopped, results in less thermal degradation of the catalytic components and a lower fuel economy penalty, as described more in detail in the detailed description below. In the temperature range where the N02-based PM regeneration process in active, e.g. 250-450° C., the dosing of ammonia-containing reductant, e.g. urea, to the second SCR catalyst is fully active so that the emissions compliance is maintained even if the dosing of gaseous ammonia to the first SCR catalyst has been stopped.

According to an aspect of the invention, the volume of said first SCR catalyst is within a range of 5% to 60% of the volume of said second SCR catalyst, specifically within a range of 5% to 40% of the volume of said second SCR catalyst, and more specifically within a range of 10% to 25% of the volume of said second SCR catalyst. Typical values of said volumes in a diesel engine for a heavy truck is about 5-10 liters for the first SCR catalyst, and about 40 liters for the second SCR catalyst. The limited volume of the first SCR catalyst results in faster warm-up and simplified positioning thereof close to the engine or turbocharger outlet. Due to the limited volume, the first SCR catalyst may not have the capacity to alone provide sufficient catalytic removal of NOx emission in the upper operating load region of the engine, i.e. upon high power demand, but the capacity is sufficient in the engine operating conditions normally associated with cold-start and low-temperature exhaust gas urban driving, i.e. a relatively low operating engine load.

According to an aspect of the invention, said exhaust system further comprises an ammonia oxidation catalyst located downstream of said second SCR catalyst. An ammonia oxidation catalyst at the end of the exhaust aftertreatment system can remove any residual ammonia in the exhaust gas that did not react in the second SCR catalyst, by means of oxidation of residual ammonia According to an aspect of the invention, said exhaust system further comprising a particulate filter positioned between said first and second SCR catalyst. Depending on the type of fuel used, more or less soot and particulate matter is produced. Diesel fuel for example produces more soot and requires thus often a particulate filter for fulfilling legal emission requirements, whereas fuel such as natural gas or dimethyl ether produces generally small amounts of soot, thereby often eliminating the need of a particulate filter.

According to an aspect of the invention, said exhaust system further comprising an oxidation catalyst located downstream of said first SCR catalyst and upstream of said particulate filter. The oxidation catalyst serves to oxidise hydrocarbons and carbon monoxide into carbon dioxide and water. The oxidation catalyst also increases the exhaust temperature. The oxidation catalyst is arranged upstream of the second SCR catalyst, which is configured to be used as sole SCR catalyst during normal highway driving and other normal and high-temperature exhaust operating conditions.

According, to an aspect of the invention, the first SCR catalyst is a vanadia-based (e.g. V205/Ti02 W03) catalyst, and said second SCR catalyst is a zeolite-based catalyst. Using a vanadia-based catalyst as first SCR catalyst is advantageous because this type of catalyst does not require NO2 for efficient selective catalytic reduction of NOx emissions. There is essentially no N02 available in the exhaust gas directly after the engine or turbocharger outlet port. Furthermore, in the case of misfueling with high-sulphur fuel (e.g. >300 ppm S), some zeolite-based SCR catalysts require elevated temperatures, e.g. 600° C., for removal of adsorbed sulphur species to regain the SCR catalyst performance. A vanadia-based SCR catalyst is generally very sulphur tolerant and does not require elevated temperatures for removal of adsorbed sulphur species.

The second SCR catalyst is preferably implemented by a zeolite-based catalyst because of its wide active temperature window, good heat-resistance and effective NOx reduction, but the second SCR catalyst may alternatively also be implemented by a vanadia-based catalyst.

According to an aspect of the invention, the gaseous ammonia supply device can be implemented in several ways. For example, one or more gas bottles holding pressurised ammonia gas can be provided and coupled to the first injector, such that gaseous ammonia may be injected upstream of the first SCR catalyst immediately upon a cold-start, or similar conditions. Replacement and handling of the gas bottles is also relatively easy. According to an alternative embodiment, a storage container may be provided that is configured to store an alkaline earth metal chloride salt, which functions as a source of said gaseous ammonia. The container is preferably heated by electrical wires or the like, thereby facilitating release of gaseous ammonia. Transporting ammonia in a solid storage medium, such as alkaline earth metal chloride salt, results in satisfactory safety and handling of the ammonia source, and only a small amount of heat is required to release the gaseous ammonia. According to yet another alternative, the gaseous ammonia supply device may comprise a storage container holding a solution of ammonia dissolved in a solvent, such as water.

According to an aspect of the invention, said first injector is formed by metal pipe that passes through a side wall of an exhaust passage of said exhaust system, and exhibits an discharge opening within said exhaust passage, such that gaseous ammonia from said gaseous ammonia supply device can be supplied to an exhaust gas flow within said exhaust passage by means of said metal pipe. As previously mentioned, the first SCR catalyst is preferably positioned very close to the engine or turbocharger outlet for rapid heat-up. However, the first injector, which is configured to supply the first SCR catalyst with gaseous ammonia and is arranged upstream of the first SCR catalyst, must consequently be positioned even closer to said outlet. There is thus a problem of extremely high heat at the position of the first injector. By forming the first injector merely by metal pipe that is arranged to receive gaseous ammonia from the ammonia supply device and release the gaseous ammonia within the exhaust passage by means if a discharge opening, the first injector is extremely heat resistant, leading to a reliable and cost-effective design and implementation of the first injector.

According, to an aspect of the invention, said first injector is free from parts made of thermo-plastic material, or other heat sensitive materials. As mentioned, providing a heat-resistant first injector improves system reliability and reduces costs. The addition of gaseous ammonia upstream the first SCR catalyst also enables a very short mixing distance compared to the corresponding injection of ammonia-containing fluid, such as urea.

According to an aspect of the invention, an electronic controller is configured to control injection of gaseous ammonia by said first injector, such that supply of gaseous ammonia to said exhaust gas by said first injector is limited to a operation mode where a temperature Tscm associated with said first SCR catalyst is above a first value Ti, and a temperature TSCR2 associated with said second SCR catalyst is below a second value T2, thereby at least partly facilitating high NOx conversion efficiency of said exhaust gas at temperatures when NOx conversion efficiency of said exhaust has by said second SCR catalyst is low. The lower end of the active temperature window of the first SCR catalyst is defined by said first value T-i, below which temperature level efficient NOx reduction is no longer accomplished.

Furthermore, as previously described, the system is configured to stop injection of gaseous ammonia upstream of the first SCR catalyst when the temperature TSC2 associated with said second SCR catalyst has reached a second value T2.

Another inventive advantage of an aspect of the present invention results from the specific supply arrangement of the active reagent ammonia to the first and second SCR catalyst of the invention. The combination of gaseous ammonia supply to the first SCR catalyst and fluid ammonia-containing reductant supply, such as supply of urea, to the second SCR catalyst allows by means of intelligent dosing strategy of said ammonia sources, extended service intervals of the exhaust aftertreatment system, rendering said system more efficient, reliable and cost effective. For example, by supplying gaseous ammonia via the first injector to the first SCR catalyst only during low-temperature exhaust gas operating conditions, such as cold-start and certain urban driving conditions, and upon reaching a certain exhaust gas temperature at the second SCR catalyst, supplying ammonia-containing reductant via the second injector to the second SCR catalyst while stopping the supply of gases ammonia, the first and second SCR catalysts are operated more or less non-simultaneously. This type of dosing strategy, which is possible by means of the inventive arrangement, does not only enable a very high NOx conversion efficiency without any penalty to fuel economy but also result in significantly extended service intervals of the exhaust aftertreatment system, i.e. longer time periods between refill or exchange of the ammonia sources. More specifically, the exchange of ammonia-containing storage containers can be performed during normal vehicle service intervals for e.g. engine oil.

According to an aspect of the invention, the temperature Tscm associated with said first SCR catalyst is the temperature of the exhaust gas in the region directly upstream of said first SCR catalyst, and the temperature TSCR2 associated with said second SCR catalyst is the temperature of the exhaust gas in the region directly upstream of said second SCR catalyst, and said first value T-i is about 120° C., preferably about 150° C., and said second value T2 is about 270° C., preferably about 250° C.

According to an aspect of the invention, an electronic controller is configured to control injection of fluid ammonia-containing reductant by said second injector, such that supply of ammonia-containing reductant to said exhaust gas by said second injector is limited to an operation mode where a temperature level TSCR2 associated with said second SCR catalyst is above a third value T3, which corresponds to a lower end of the active temperature window of the second SCR catalyst. The second value T2 may be set equal to T3, such that injection at the first injector ends when injection at the second injector begins.

Alternatively, the second value may be arranged a certain level above the third value T3, such that a certain injection overlap occurs by the first and second injectors. In other words, the overlapping temperature range, which is defined by the second value T2 and third value T3, signifies that both the first and second SCR catalysts are temporarily in a simultaneous operating mode during a hand over and start-up of NOx catalytic reduction from one SCR catalyst to the other SCR catalyst. The electronic controller allows fast and economical control of the exhaust aftertreatment system in general, especially with respect to the particular dosing strategy used by the inventive system.

According to an aspect of the invention, said temperature TSCR2 associated with said second SCR catalyst is the temperature of the exhaust gas in the region directly upstream of said second SCR catalyst, and said third value T3 is 200° C., preferably 250° C.

According to an aspect of the invention, said first SCR catalyst is arranged less than 0.6 meters downstream from an exhaust manifold outlet or turbo exhaust outlet of said engine, preferably less than 0.4 meters downstream from an exhaust manifold outlet or turbo exhaust outlet, and more preferably less than 0.25 meters downstream from an exhaust manifold outlet or turbo exhaust outlet. By arranging the first SCR catalyst more close to the exhaust manifold outlet, or turbo exhaust outlet if a turbocharger is provided, the exhaust gases passing through the first SCR catalyst will be warmer, thereby facilitating a more rapid warm-up of said catalyst.

According to an aspect of the invention, an electronic controller is configured to control injection of fluid ammonia-containing reductant by said second injector. The electronic controller allows fast and economical control of the exhaust aftertreatment system in general, especially with respect to the particular dosing strategy used by the inventive system.

According to an aspect of the invention, said second injector is provided downstream of said particulate filter. This arrangement prevents ammonia-containing reductant from entering the DPF.

According to another aspect of the invention, a method of operating an exhaust system comprising a first SCR catalyst; a second SCR catalyst positioned downstream of said first SCR catalyst; a first injector provided upstream of said first SCR catalyst; and a second injector provided upstream of said second SCR catalyst, wherein the method comprises the steps of controlling injection of gaseous ammonia by a first injector, such that supply of gaseous ammonia to said exhaust as by said first injector is limited to a operation mode where a temperature (TSCR1) associated with said first SCR catalyst is above a first value (T-i), and a temperature (TSCFS) associated with said second SCR catalyst is below a second value (T2), thereby at least partly facilitating high NOx conversion efficiency of said exhaust gas at temperatures when NOx conversion efficiency of said exhaust gas by said second SCR catalyst is low.

According to a first embodiment of the method, the temperature (TSCR1) associated with said first SCR catalyst (10) is the temperature of the exhaust gas in the region directly upstream of said first SCR catalyst (10), and said temperature (TSCR2) associated with said second SCR catalyst (16) is the temperature of the exhaust gas in the region directly upstream of said second SCR catalyst (16), and said first value (T is 120° C., preferably 150° C., and said second value (T2) is 270° C., preferably 250° C.

According to a second embodiment, the method comprises the step of controlling injection of fluid ammonia-containing reductant by said second injector, such that supply of ammonia-containing reductant to said exhaust gas by said second injector is limited to an operation mode where a temperature level (TSCFS) associated with said second SCR catalyst is above a third value (T3).

According to a first embodiment of the method, said temperature (TSCR2) associated with said second SCR catalyst is the temperature of the exhaust gas in the region directly upstream of said second SCR catalyst, and said third value (T3) is 200° C., preferably 250° C.

BRIEF DESCRIPTION OF THE DRAWINGS

The present invention will now be described in detail with reference to the figures, wherein.

DETAILED DESCRIPTION

Figure 1:
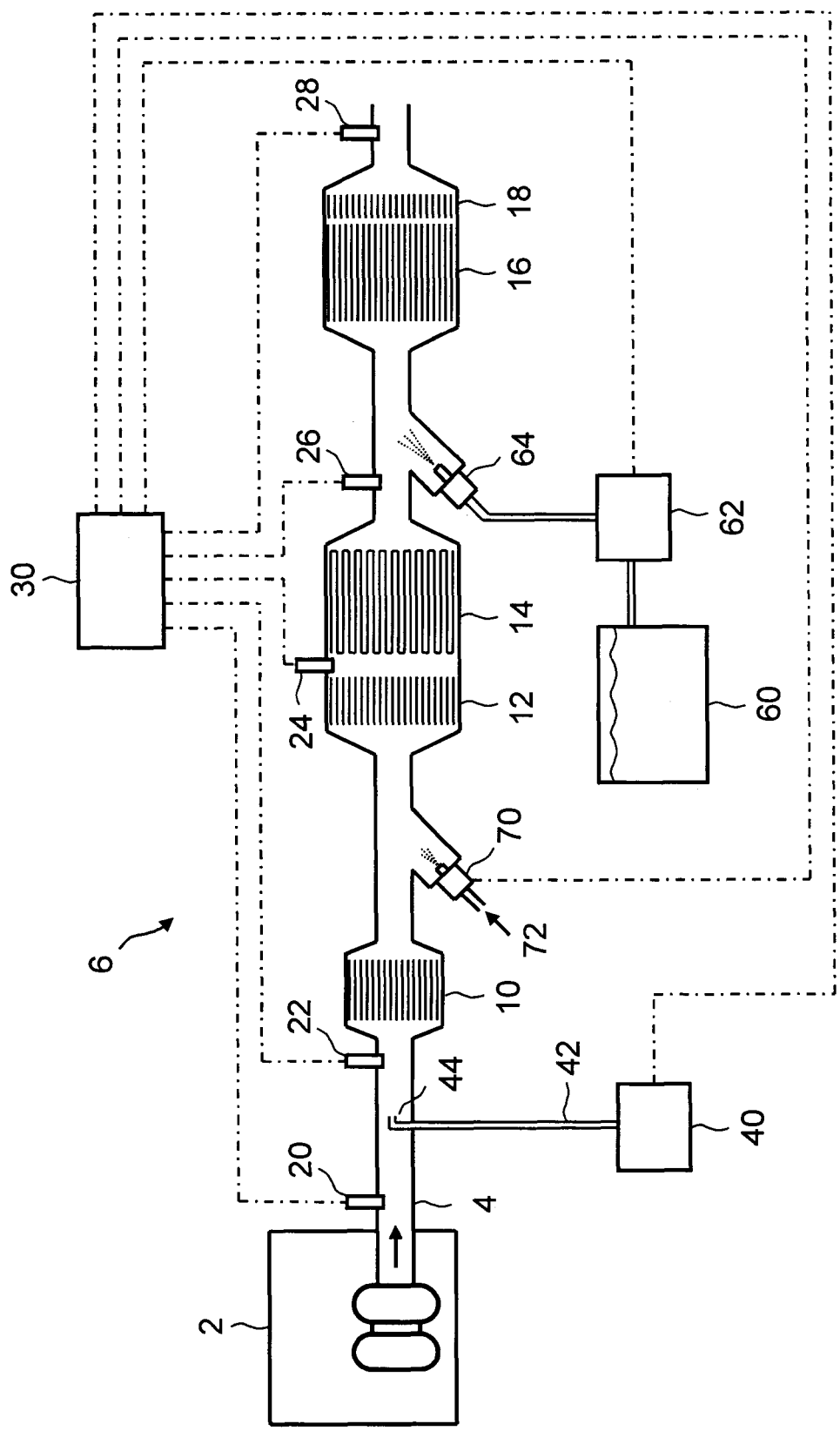
FIG. 1 shows a schematic structure of the exhaust system according to the invention.

Various aspects of the invention will hereinafter be described in conjunction with the appended drawings provided to illustrate and not to limit the invention.

The use of selective catalytic reduction (SCR) for reducing NOx emissions is widespread within the automotive industry, with the most common technology using, urea ($NH_2CONH_2$) as a precursor to ammonia ($NH_3$) for the catalytic removal of NOx emissions. The invention is not limited to urea as ammonia-containing reductant, and other reductant types currently used in SCR applications may alternatively be used, such as aqueous ammonia. The NOx abatement efficiency of an SCR catalyst has a two-fold temperature dependence, limiting the efficiency during low-temperature exhaust conditions. The reaction rates of the catalytic reactions for NOx removal are dependent on temperature, with an active temperature window generally starting at a catalyst temperature of e.g. 150° C., depending also on the NO:$NO_2$ ratio of the feedgas NOx emissions.

In the case where area is employed as reductant for SCR, the decomposition reactions, i.e. thermolysis and hydrolysis of urea to produce gaseous ammonia and carbon dioxide, are highly dependent on temperature. If the exhaust temperature upstream the SCR catalyst is below a certain level, e.g. 200° C., there is a risk for incomplete urea decomposition, thus limiting the NOx removal efficiency. There is also a risk for formation of unwanted solid by-products through polymerization reactions, causing, clogging of the SCR catalyst and an increased back pressure of the exhaust aftertreatment system.

In combined exhaust aftertreatment systems with multiple types of catalysts, it is beneficial to position a diesel oxidation catalyst (DOC) and diesel particulate filter (DPF) upstream the SCR catalyst. One of the reasons is that for a DOC, the temperature needs to be above a certain threshold level, generally called the light-off temperature, to attain activation with respect to conversion of CO and HC as well as the oxidation of NO to $NO_2$.

For the DPF, a process commonly known as regeneration is performed to oxidize and remove carbonaceous PM collected in the particulate filter, and there are two Well-known major oxidation mechanisms. For relatively rapid regeneration with residual oxygen in the exhaust gas stream, the temperature of the particulate filter needs to be elevated to levels considerably higher than exhaust temperatures normally encountered during diesel engine operation, e.g. 550-650° C. The regeneration of a DPF may be performed at significantly lower temperatures (e.g. 250-450° C.) if $NO_2$ is used as oxidant rather than oxygen. Whereas the $NO_2$-based PM regeneration process is slower than oxygen-based regeneration, the advantages include less thermal degradation of the catalytic components and a lower fuel economy penalty. In addition, the lower exhaust temperature enables a greater efficiency for the downstream selective catalytic reduction of NOx emissions.

An $NO_2$-based regeneration process is greatly enhanced by positioning the DPF downstream the DOC. If the SCR catalyst would be located upstream the DPF, the $NO_2$-based regeneration becomes ineffective due to the absence of NOx emissions downstream the SCR catalyst. As a consequence, the best solution is generally to position the SCR catalyst downstream both the DOC and DPF.

While this configuration is advantageous for the efficient regeneration of PM in the DPF, a drawback of such an exhaust aftertreatment system definition is that the cold start properties of the SCR catalyst and thus also for NOx emissions control are far from ideal. A significant amount of heat is required to raise the temperature of the DOC and DPF units so as to attain a sufficiently high working temperature for the SCR catalyst and enable dosing of ammonia-containing reductant, e.g., urea. In addition, temperature losses may occur in the exhaust aftertreatment prior to the SCR catalyst. For the reasons described above, the NOx abatement efficiency of the SCR catalyst can be limited by its position relatively far from the engine in the chosen exhaust aftertreatment system definition.

Positioning the SCR catalyst upstream of the DPF results in other problems. An ammonia reductant injector must be positioned upstream of the SCR catalyst, and thus very close to the turbocharger. The ammonia reductant injector is however generally sensitive to high-temperature exposure and have a bulky design which may cause packaging issues in the normally very limited packaging space available close to the turbocharger outlet. In addition, a certain mixing length, e.g. minimum 0.50 m, is generally required for the decomposition of ammonia reductant, such as urea, prior to the SCR catalyst, placing further geometric packaging demands on the installation. In addition, for the complete decomposition of urea prior to the SCR catalyst, an exhaust temperature should be approximately 200° C. The NOx abatement efficiency at low temperatures or shortly after cold start is thus primarily limited by the urea decomposition rate, not the SCR reaction rates of the SCR catalyst.

In the present invention, the active temperature range of SCR is dramatically enhanced, both by improving the temperature conditions for the SCR catalyst and by removing the temperature limitation of urea decomposition to the active reagent ammonia. Regeneration of the DPF may further be mainly N02-based, assuring an efficient, less harmful and more economical regeneration.

An inventive exhaust system according to the invention is shown in FIG. 1 For a compression ignition engine 2, an exhaust stream 4 contains an exhaust system 6, which consists of or comprises, in said order, a smaller first selective catalytic reduction catalyst 10, an oxidation catalyst 12 also referred to a diesel oxidation catalyst (DOC), a particulate filter 14 for the collection of particulate matter from the engine and a larger second selective catalytic reduction catalyst 16 for the abatement of NOx emissions. An ammonia oxidation catalyst 18 may be positioned downstream second selective catalytic reduction catalyst 16 for conversion of excess ammonia.

A supply of gaseous ammonia is positioned upstream the first selective catalytic reduction catalyst 10. A controlled dosing rate of ammonia gas from an ammonia supply device 40 is led through a pipe 42 and through a first injector 44 into the exhaust gas stream 4 upstream the first selective catalytic reduction catalyst 0. The first injector 44 is positioned directly upstream the first selective catalytic reduction catalyst 0.

The ammonia supply device 40 may be constituted in different ways.

According to a first preferred example, the ammonia supply device 40 is formed by a gas container holding pressurized ammonia gas. The feeding rate of ammonia gas may be controlled by an electronic control unit 30 through e.g. a mass flow control device.

According to second example, the ammonia supply device 40 is formed by a container with an alkaline earth metal chloride salt (SrCI2, CaCI2 or gCI2) which readily stores ammonia in the form of an alkaline earth metal chloride chemical complex with ammonia, e.g. Sr(NH3)6CI2, Ca(NH3)8CI2 or Mg(NH3)6CI2. The ammonia-containing container may be equipped with a heating device to initiate the decomposition of the complex into the alkaline earth metal chloride salt and ammonia, thus raising the partial pressure of gaseous ammonia. The dosing rate of ammonia gas may also here be controlled by an electronic control unit 30 through e.g. a mass flow control device.

According to third example, the ammonia supply device 40 is formed by a container holding a solution of ammonia dissolved in a solvent, e.g. water. The feeding rate of ammonia gas may be controlled by the electronic control unit 30 through e.g. a pump unit.

A reservoir 60 containing ammonia-containing reductant, such as urea, is connected to a pumping unit 62. The electronic control unit 30 controls the pumping unit 62 and the flow rate of fluid to a second injector 64 positioned upstream the second selective catalytic reduction catalyst 16. The second injector 64 is positioned directly upstream the second selective catalytic reduction catalyst 16. The second injector 64 is positioned downstream the oxidation catalyst 12. The second injector 64 is positioned downstream the particulate filter 14.

A fuel dosing unit 70 is fed with a fuel supply 72 from a fuel container (not shown), and may dose fuel into said exhaust aftertreatment system 6 upstream the oxidation catalyst 12. The fuel dosing unit 70 is controlled by the electronic control unit 30 and operated with the purpose of elevating the exhaust temperature to a level where the oxidation efficiency of the carbonaceous PM loaded onto the particulate filter 14 is enhanced so as to oxidize the PM in rapid manner without damaging the integrity of neither the oxidation catalyst 12 nor the particulate filter 14. Unburned fuel may alternatively be temporarily supplied to the exhaust system by the fuel injectors of the combustion engine upon appropriate injection timing.

The control of the exhaust aftertreatment system 6 is performed with the help of multiple gas sensing devices. A first NOx emission sensor 20 may be fitted directly downstream the engine 2 for assessing the feedgas NOx emission level. A second NOx emissions sensor 28 is fitted directly downstream the ammonia oxidation catalyst 18 for assessing the NOx emission level of the exhaust gas released to the ambient environment. A first temperature sensor 22 is positioned upstream the smaller first selective catalytic reduction catalyst 10. A second temperature sensor 24 is positioned upstream the particulate filter 14, and a third temperature sensor 26 is positioned downstream the particulate filter 14.

The respective measurement signals of sensing units 20, 22, 24, 26 and 28 are fed to the electronic control unit 30, from which the first and second injector 44, 64 and fuel dosing unit 70 are controlled as previously described. The measurement signals from NOx sensors 20 and 28 are led to the electronic control unit 30 as inputs to the reductant dosing strategy.

Figure 2:
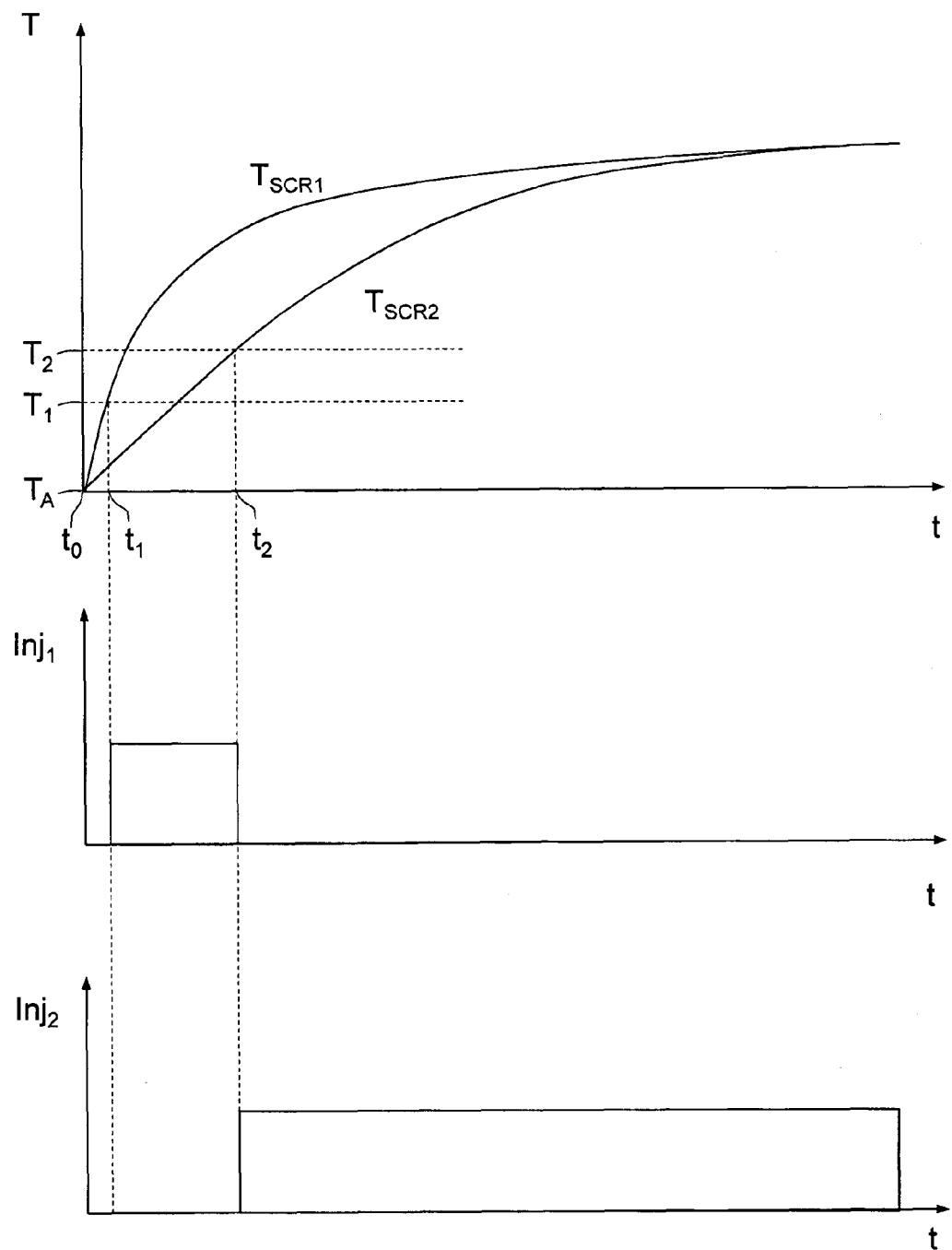
FIG. 2 shows a typical dosage strategy according to the invention.

In FIG. 2, the dosing strategy during a typical engine cold-start is illustrated. In the upper chart, time is plotted along the x-axis and temperature of the respective SCR catalyst is plotted up the y-axis, the centre chart illustrates very schematically the corresponding dosage activity of the first injector 44 plotted up the y-axis with time being plotted along the x-axis, and the lower chart illustrates equally schematic the corresponding dosage activity of the second injector 64 plotted up the y-axis with time being plotted along the x-axis. Said dosage activity of each injector 44, 46 being controlled by the electronic control unit 30, and is here illustrated by two states only on or off. Initially, at time t0, immediately at engine cold-start, the temperature TSCR1>TSCR2, of the first and second SCR catalyst 10, 16 are close to ambient temperature TA, and no injection is performed by the first or second injectors 44, 64. With the engine running, warm exhaust gases quickly heats up the first SCR catalyst 10 due to its position close to the engine or turbocharger outlet, as well as the relatively small thermal capacity thereof. As clearly illustrated, the first SCR catalyst 10 heats up much quicker than the second SCR catalyst 16.

At time ti, the temperature associated with the first SCR catalyst has reached a first value Ti, for example 150° C., representing the lower end of the active temperature window of the first SCR catalyst 10, and injection of gaseous ammonia by the first injector 44 is initiated, as illustrated in the centre chart. In the disclosed embodiment, the electronic control unit 30 determines the temperature of the first SCR catalyst based on temperature of the exhaust gas as measured by the first temperature sensor 22. Time ti depends on many factors such as type of SCR catalyst, engine size, power output, etc, and may typically be about 1 minute.

At time X2, the temperature associated with the second SCR catalyst has reached a second value T2, for example 250° C., representing the lowest temperature at which efficient NOx reduction may be realised by the second SCR catalyst 16, and efficient decomposition of the ammonia-containing reductant by thermolysis and hydrolysis to produce gaseous ammonia may be realised. Time t2 depends on many factors such as type of SCR catalyst, engine size, power output, ammonia-containing reductant, etc, and may typically be about 10 minutes. At this time point, injection of gaseous ammonia by the first injector 44 is discontinued and injection of fluid ammonia-containing reductant by the second injector 64 is initiated instead, as illustrated in the centre and lower chart of FIG. 2. The transition from the injection by the first injector 44 to injection by the second injector 64 may be realised instantaneous, or have a certain overlap, in which both the first and second injector 44, 64 is operated simultaneously to assure efficient reduction of NOx emissions at all times. In the disclosed embodiment, the electronic control unit 30 determines the temperature of the second SCR catalyst based on the temperature of the exhaust gas as measured by the second temperature sensor 26.

If, during the subsequent operation, the engine is used in low-temperature operating conditions and the exhaust temperature drops below the aforementioned threshold value of the second SCR catalyst (e.g. 250° C.), injection of gaseous ammonia at the first injector 44 may be restarted again, and the injection of ammonia-containing reductant at the second injector 64 may be stopped or limited to avoid incomplete decomposition of urea and the formation of solid by-products in the exhaust line upstream the second SCR catalyst.

This type of dynamic dosing strategy enables a very high NOx conversion efficiency without any penalty to fuel economy. Furthermore, the strategy can be tuned to allow for efficient NO2-based PM regeneration process of the particulate filter 14 by stopping ammonia dosing to the first SCR catalyst 10 at temperatures where the NO2-based PM regeneration process starts to become active, e.g. 250° C.

In addition, the consumption of gaseous ammonia can be limited in order to prolong the time before the ammonia supply device 40 is emptied of its entire ammonia content.

The refilling of ammonia into the ammonia supply device 40 when emptied of its entire ammonia content needs to be performed by replacing the entire unit by one saturated with ammonia. For many vehicle applications, this replacement would have to be made on a relatively frequent basis, especially for vehicles operated at high loads and with large mass flow rates of feedgas NOx emissions. Practical problems for such servicing arise due to the lack of an infrastructure for the widespread distribution of such units. In contrast, an infrastructure for the widespread distribution of commercial urea solutions under the commercial names AdBlue® or DEF is established on many markets and is becoming established on even more markets worldwide.

A significant advantage of the present invention is that the dimensioning of the ammonia supply device 40 and the dynamic dosing strategy involving both gaseous ammonia and ammonia-containing reductant, e.g. urea, can be controlled in such a way that the ammonia supply device 40 only needs to be replaced at the normal vehicle service intervals. The distribution of the ammonia supply device 40 only needs to be extended to the conventional workshops, making an infrastructure for the widespread distribution of such ammonia supply devices 40 redundant. The refilling of ammonia-containing reductant, e.g. urea to the reservoir 60 can be performed utilizing the widespread distribution of commercial urea solutions, e.g. AdBlue® or DEF.

An advantage of the present invention compared to the concept described above, is that the first dosing arrangement consists of or comprises a metallic pipe 42 and first injector 44 with a very simple design which can easily withstand high temperatures and has a minimum space claim. The first injector 44 preferably being formed by an opening at the end of the metallic pipe. Mass flow control devices are generally temperature-sensitive and can in the present invention be positioned away from the hot surfaces close to the turbocharger. For ammonia gas dosing, a relatively short. mixing length, e.g. 0.25 m, is required to achieve a uniform ammonia gas distribution over the cross section of the first SCR catalyst 10. In contrast to the use of urea as reductant, the NOx abatement efficiency at low temperatures is not limited by the urea decomposition rate in the present invention, since the reductant is added in the form of the desired reactant ammonia. The full active temperature window of the first SCR catalyst 10 may thus be employed.

The term volume of the SCR catalyst is herein considered to define the geometrical volume as derived from the outer geometrical dimensions of the catalyst substrate.

Reference signs mentioned in the claims should not be seen as limiting the extent of the matter protected by the claims. As will be realised, the invention is capable of modification in various obvious respects, all without departing from the scope of the appended claims. Accordingly, the drawings and the description thereto are to be regarded as illustrative in nature, and not restrictive.

The invention claimed is:

1. An exhaust system for receiving an exhaust gas, the exhaust system comprising:
   a first SCR catalyst;
   a second SCR catalyst positioned downstream of the first SCR catalyst;
   a first injector provided upstream of the first SCR catalyst;
   a second injector provided upstream of the second SCR catalyst;
   a gaseous ammonia supply device being fluidly connected to the first injector for supplying gaseous ammonia to the exhaust gas by the first injector; and
   an ammonia-containing reductant reservoir being fluidly connected to the second injector for supplying a fluid ammonia-containing reductant to the exhaust gas by the second injector; wherein the first SCR catalyst has a smaller volume than the second SCR catalyst for a fast warm-up of the first SCR catalyst.

2. The exhaust system according to claim 1, the volume of the first SCR catalyst is within a range of 5% to 60% of the volume of the second SCR catalyst.

3. The exhaust system according to claim 1, wherein the exhaust system further comprising an ammonia oxidation catalyst located, downstream of the second SCR catalyst.

4. The exhaust system according to claim 1, wherein an articulate filter is positioned between the first and second SCR catalyst.

5. The exhaust system according to claim 4, wherein the exhaust system further comprising an oxidation catalyst located downstream of the first SCR catalyst and upstream of the particulate filter.

6. The exhaust system according to claim 1, wherein the first SCR catalyst is a vanadia-based catalyst, and the second SCR catalyst is a zeolite-based catalyst.

7. The exhaust system according to claim 1, wherein the gaseous ammonia supply device comprises:
   a storage container, which is configured to store an alkaline earth metal chloride salt that is the source of the gaseous ammonia; or
   a storage container holding a solution of ammonia dissolved in a solvent; or
   a gas bottle holding pressurised ammonia gas.

8. The exhaust system according to claim 1, wherein the first injector is formed by a metal pipe that passes through a side wall of an exhaust passage of the exhaust system, and exhibits an discharge opening within the exhaust passage, such that gaseous ammonia from the gaseous ammonia supply device can be supplied to an exhaust gas flow within the exhaust passage by means oldie metal pipe.

9. The exhaust system according to claim 8, wherein the first injector is free from parts made of thermoplastic material, or other heat sensitive materials.

10. The exhaust system according to claim 1, wherein an electronic controller is configured to control injection of gaseous ammonia by the first injector, such that supply of gaseous ammonia to the exhaust gas by the first injector is limited to a operation mode where a temperature (TSCR1) associated with the first SCR catalyst is above a first value (T1), and a temperature (TscR2) associated with the second SCR catalyst is below a second value (T2), thereby at least partly facilitating high NOx conversion efficiency of the exhaust gas at temperatures when NOx conversion efficiency of the exhaust gas by the second SCR catalyst is low.

11. The exhaust system according to claim 10, wherein the temperature (TscR1) associated with the first SCR catalyst is the temperature of the exhaust gas in the region directly upstream of the first SCR catalyst, and the temperature (TscR2) associated with the second SCR catalyst is the temperature of the exhaust gas in the region directly upstream of the second SCR catalyst, and the first value (T1) is 120° C., and the second value (T2) is 270° C.

12. The exhaust system according to claim 1, wherein an electronic controller is configured to control injection of fluid ammonia-containing reductant by the second injector, such that supply of ammonia-containing reductant to the exhaust gas by the second injector is limited to an operation mode where a temperature level (TscR2) associated with the second SCR catalyst is above a third value (T3).

13. The exhaust system according to claim 12, wherein the temperature (TscR2) associated with the second SCR catalyst is the temperature of the exhaust gas in the region directly upstream of the second SCR catalyst, and the third value (T13) is 200° C.

14. The exhaust system according to claim 1, wherein the first SCR catalyst is arranged less than 0.6 meters downstream from an exhaust manifold outlet or turbo exhaust outlet of the engine.

15. The exhaust system according to claim 14, wherein the second injector is provided downstream of the particulate filter.

16. The exhaust system according to claim 1, wherein an electronic controller is configured to control injection of fluid ammonia-containing reductant by the second injector.

17. Method of operating an exhaust system comprising
a first SCR catalyst;
a second SCR catalyst positioned downstream of the first SCR catalyst;
a first injector provided upstream of the first SCR catalyst; and a
second injector provided upstream of the second SCR catalyst,
wherein the method comprises
controlling injection of gaseous ammonia by a first injector, such that supply of gaseous ammonia to the exhaust gas by the first injector is limited to a operation mode where a temperature (TscR1) associated with the first SCR catalyst is above a first value (T1), and a temperature (TscRz) associated with the second SCR catalyst is below a second value (Tz), thereby at least partly facilitating high NOx conversion efficiency of the exhaust gas at temperatures when NOx conversion efficiency of the exhaust gas by the second SCR catalyst is low, and
controlling injection of fluid ammonia-containing reductant by the second injector, such that supply of ammonia containing reductant to the exhaust gas by the second injector is limited to an operation mode where a temperature level (TscR2) associated with the second SCR catalyst is above a third value (T3).

18. Method according to claim 17, wherein temperature (TscR1) associated with the first SCR catalyst is the temperature of the exhaust gas in the region directly upstream of the first SCR catalyst, and the temperature (TscR2) associated with the second SCR catalyst is the temperature of the exhaust gas in the region directly upstream of the second SCR catalyst, and the first value (T1) 120° C. and the second value (T2) is 270° C.

19. Method according to claim 17, wherein the temperature (TscR2) associated with the second SCR catalyst is the temperature of the exhaust gas in the region directly upstream of the second SCR catalyst, and the third value (T3) is 200° C.

* * * * *